March 5, 1929.  O. J. KUHLKE  1,704,292
COLLAPSIBLE CORE
Filed Nov. 5, 1924  3 Sheets-Sheet 1.

INVENTOR.
Otto J. Kuhlke.
BY
ATTORNEY.

March 5, 1929.  O. J. KUHLKE  1,704,292
COLLAPSIBLE CORE
Filed Nov. 5, 1924   3 Sheets-Sheet 2

INVENTOR.
Otto J. Kuhlke.
BY
ATTORNEY.

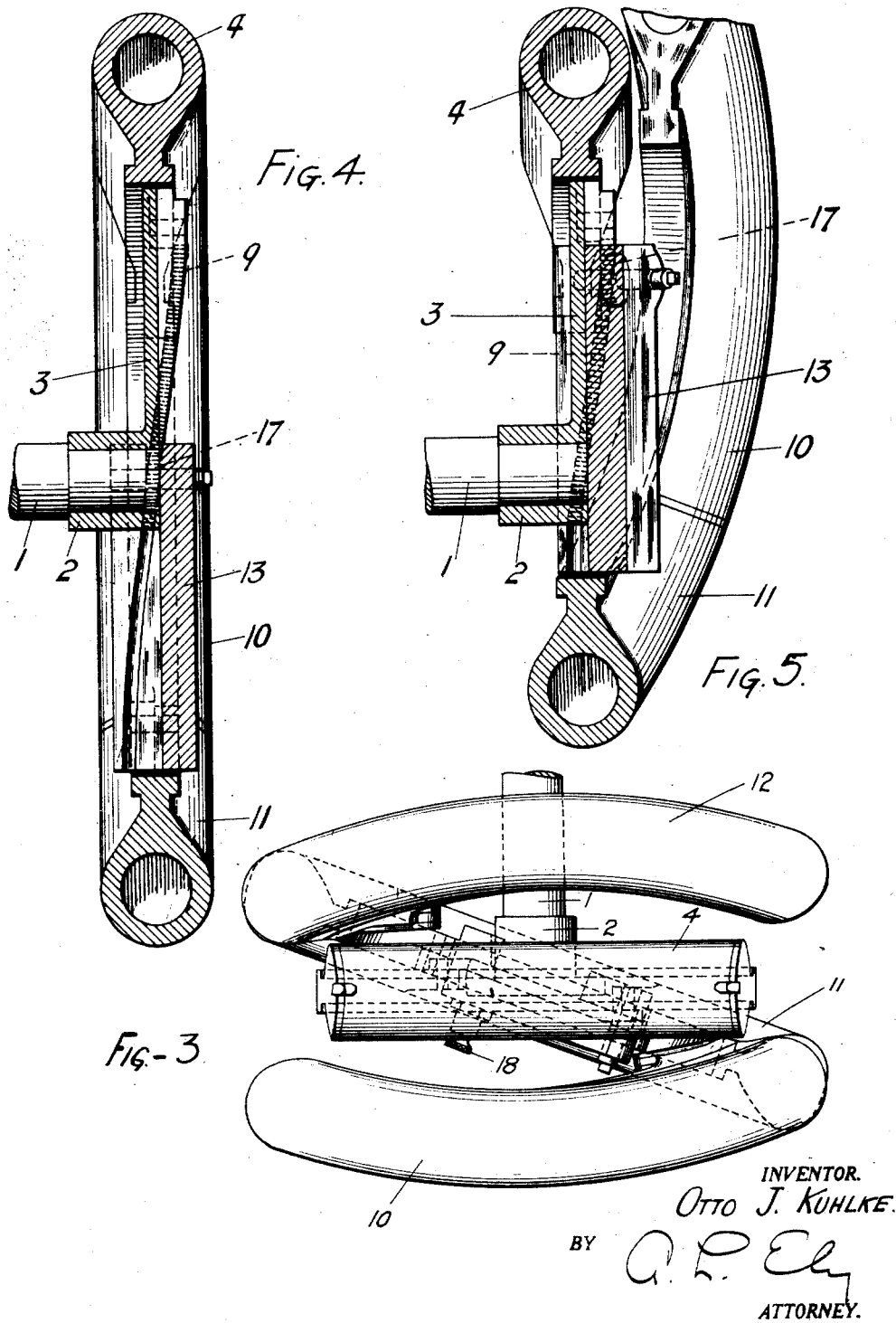

Patented Mar. 5, 1929.

1,704,292

UNITED STATES PATENT OFFICE.

OTTO J. KUHLKE, OF AKRON, OHIO, ASSIGNOR TO THE KUHLKE MACHINE COMPANY, OF AKRON, OHIO, A CORPORATION OF OHIO.

COLLAPSIBLE CORE.

Application filed November 5, 1924. Serial No. 747,911.

This invention relates to collapsible cores or forms such as used in the manufacture of pneumatic tire casings and particularly to that type of core in which the collapsing mechanism is so designed and constructed that the core sections can be readily collapsed and restored to circular condition. Core constructions for this purpose are well known, but it is the object of the present invention to improve upon the devices in the manner described and shown herein and as set forth in the claims appended hereto.

It will be understood that the description and drawings are intended to show one form of collapsing mechanism only and that changes and modifications in specific embodiments may be made within the scope of the invention.

The broadest aspects of the present invention are covered in my application, Serial No. 747,913, filed November 5, 1924.

In the drawings is shown the preferred embodiment of the present invention, in which Figure 1 is a side elevation of the core in assembled condition, in which condition a tire may be built thereon;

Figure 3 is a plan view of the core in collapsed position;

Figure 4 is a section on the line 4—4 of Figure 1;

Figure 5 is a section on the line 5—5 of Figure 2; and

Figure 1:
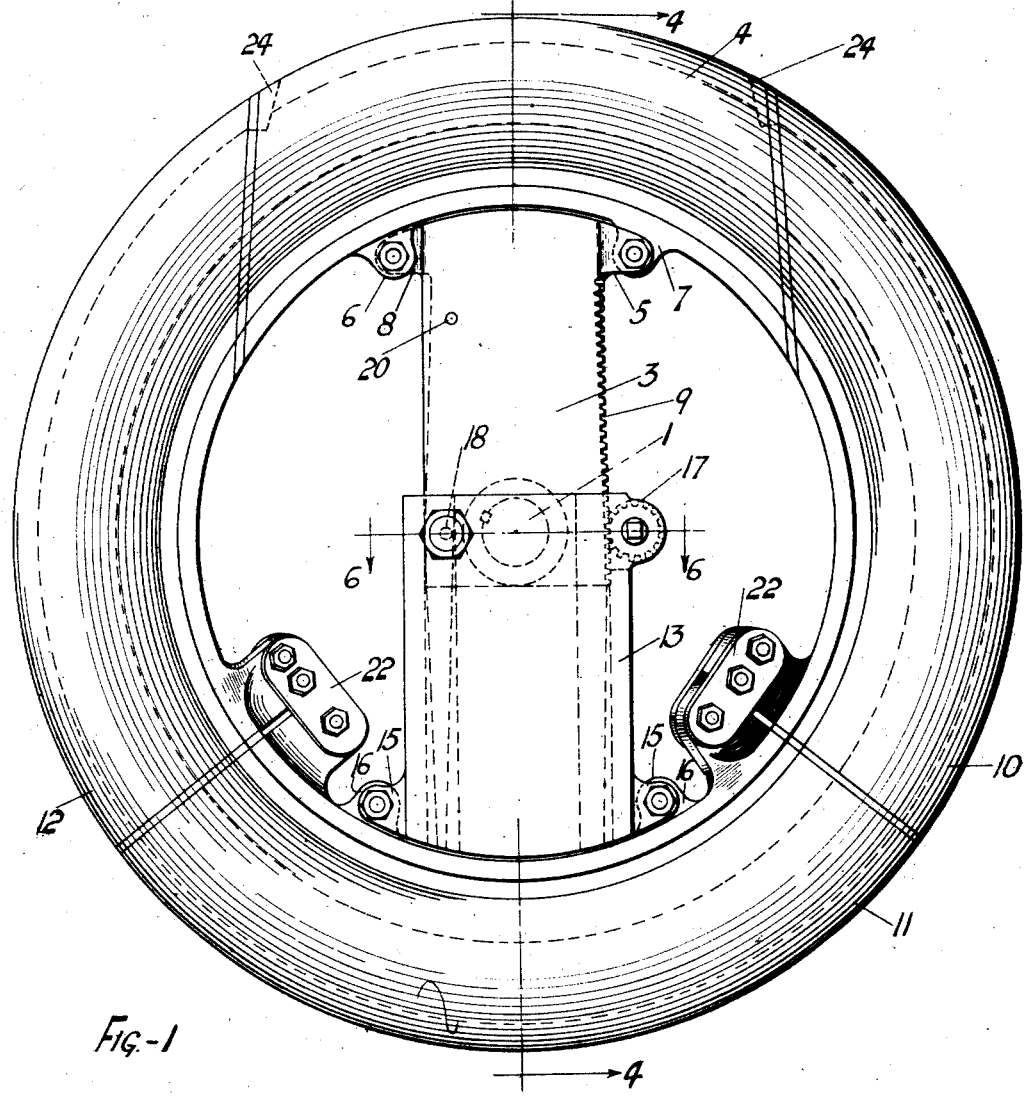
Figure 6:
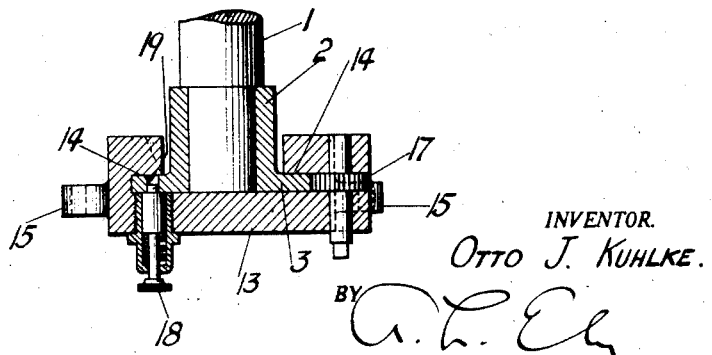
Figure 6 is a section on the line 6—6 of Figure 1.

The core of the present invention is distinguished from prior constructions in that the usual key section is maintained in stationary relation to the core shaft, while the remainder of the sections are moved as a unit so that the key section is within the inner circumference of the tire. When the core and tire are in this position, the remaining core sections are collapsed and the tire can be removed. The present core is also characterized by the fact that the sections, constituting the unit referred to above, are connected together so that in collapsing the sections constituting the unit they will form an approximate helix, and in the movement of the unit composed of the plurality of sections, the plane of the unit is rotated slightly so that the key section will be substantially parallel to the movable sections of the unit when the core is collapsed, and the key section will lie between the ends of the helix.

The core shaft, which supports the core and by which it is rotated, is indicated by the numeral 1 and at its forward end is secured in a boss 2 which is formed on the rear face of a central plate 3. This plate forms the support for the core and serves to support rigidly the key section of the core 4.

The key section is arranged to be supported so that it lies in a plane perpendicular to the core shaft, but in order to accomplish certain purposes of the invention the plate 3 is given a fractional spiral turn or twist so that its upper or outer end is at an angle to the plane of the key section. This construction is illustrated in the drawings, in which it will be observed that the outer end of the plate is turned slightly with respect to the remainder of the plate and is provided with two lugs or ears 5 and 6 which are attached in front and to the rear, respectively, of lugs 7 and 8 formed on the inside of the core section 4. One edge of the plate is formed with a rack 9 which is used for the purpose of moving the group or unit of core sections in the first collapsing operation.

Figure 2:
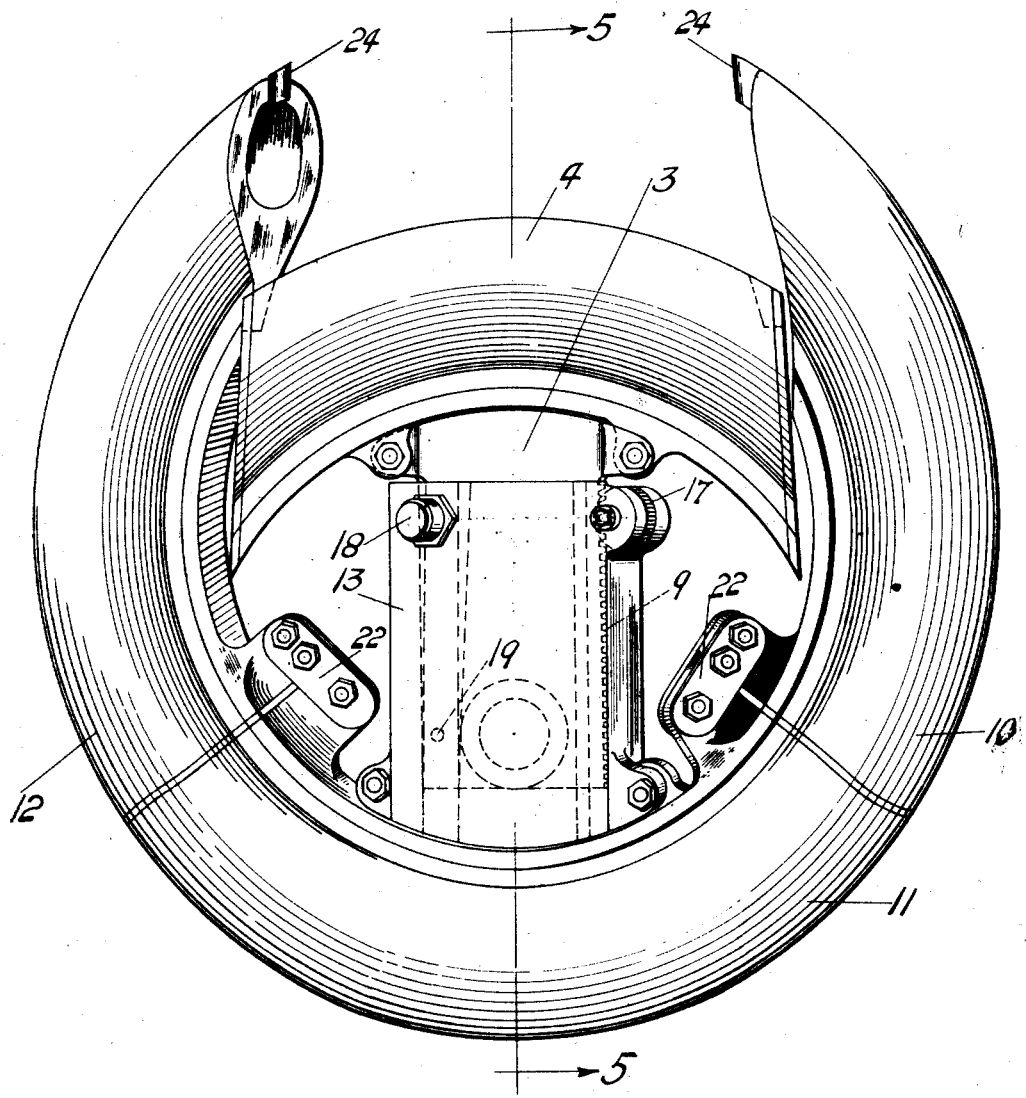
Figure 2 is a similar view showing the core at the termination of the first collapsing movement.

The core sections which constitute the remainder of the core with the section 4, are indicated by the numerals 10, 11 and 12, the section 11 being a relatively rigid section and being located between the two movable hinged sections 10 and 12. The group of sections is carried by and guided in its movement by a slide or rail 13, the rear of which is provided with channels 14 which are received over the edges of the plate 3. The outer end of the guideway is formed with lugs 15 which are secured to corresponding lugs 16 on the inner circumference of the section 11. At its inner end the guideway is provided with a pinion 17 which meshes with the rack 9 and is adapted to be rotated by a wrench, or other suitable means, so that as the pinion is rotated the guideway will move over the plate and thereby bring the group of core sections into the position shown in Figure 2. A spring operated pin 18 is mounted in the guideway 13 and is designed to be received in one of two holes 19 or 20 when the group of core sections is at its outer or inner limits of movement, respectively, thereby locking the sections in the position described.

When the pinion 17 is rotated in the manner described in bringing the core to collapsed position, the group of sections will move relatively to the supporting shaft and will lift the tire away from the key section, the unit rotating partially, due to the curvature of the plate 3, so that its plane intersects the original core plane, the degree of turning movement being such that the key section will be approximately parallel to and will lie between the sections 10 and 12 when they are collapsed in the manner to be described.

The sections 10 and 12 are connected to the rigid section 11 by means of inclined hinges 22, so that, when these sections are freed of the key section, they can be folded inwardly to form an approximate helix with the section 11. The angular position of the hinges 22 is such that the sections 10 and 12 will clear the section 4 and will lie on either side thereof in collapsed position. This is illustrated in Figure 3 of the drawings. The free ends of the sections 10 and 12 may be provided with keys 24 which are received in sockets or keyways in the ends of the section 4.

It will be observed that there has been provided a group of sections which together constitute a unit and which are movable beyond and outwardly of the key section 4 so as to carry the tire away from that section. The unit is definitely guided in this movement by the plate 3 and is also partially rotated so that the sections which are swung inwardly can do so without interfering with the key section. It is obvious that, having explained the primary features of the invention, its specific embodiments may be constituted in other forms than that shown and described.

It will be understood that certain principles of the invention may be applied to tire building forms of various shapes and cross sections, not being necessarily limited to the rounded core section shown herein. Where the term "core" is used throughout the specification and claims, it will be understood that this term is used broadly and may cover any tire building form.

What is claimed is:

1. In a collapsible form construction, a key section, means for securing the key section in fixed relation to the form support, and a group of form sections, means for moving the group of form sections toward and from the center of the form, and means for guiding the group of sections and simultaneously rotating the plane thereof.

2. In a collapsible form construction, a key section, means for securing the key section in fixed relation to the form support, and a group of form sections movable toward and from the center of the form, and means for guiding the group of form sections and simultaneously rotating the group about an axis radial to the form.

3. In a collapsible core construction, a stationary key section and a group of core sections which comprises a rigid section and a swinging section which is angularly pivoted thereto, and means for moving the group of core sections and simultaneously rotating the group about an axis radial to the form.

4. In a collapsible core construction, a stationary key section and a group of core sections which comprises a rigid section and two angularly pivoted swinging sections, and means for moving the group of core sections and simultaneously rotating the plane thereof so that the angularly pivoted sections in collapsed position will lie approximately parallel to the key section and on opposite sides thereof.

5. In a collapsible core construction, a key section and a group of core sections which comprises two angularly pivoted swinging sections, the key section and the group of sections being relatively rotatable so that the angularly pivoted sections in collapsed position will lie approximately parallel to the key section and on opposite sides thereof.

6. In a collapsible core construction, a key section and a group of core sections comprising a rigid section and a swinging section and means to move the group of sections and rotate it so that the plane thereof intersects the original core plane.

7. In a collapsible form construction, a form shaft, a plate secured thereon, the plate having a partial spiral twist therein, a group of form sections, and a slide movable over the plate to which the group is attached.

8. In a collapsible core construction, a core shaft, a support secured thereon, a key section carried on the end of the support, a group of core sections, a slide movable over the support, the group of sections being carried by the slide, and means to impart a twisting movement to the group of sections to cause the plane thereof to intersect the original core plane.

OTTO J. KUHLKE.